United States Patent
Iwakami et al.

(10) Patent No.: US 10,479,435 B2
(45) Date of Patent: Nov. 19, 2019

(54) VEHICLE BODY FRAME STRUCTURE FOR SADDLE RIDING VEHICLE

(71) Applicant: HONDA MOTOR CO., LTD., Tokyo (JP)

(72) Inventors: Hiroshi Iwakami, Tokyo (JP); Shimpei Shikanai, Kikuchi-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 38 days.

(21) Appl. No.: 15/886,147

(22) Filed: Feb. 1, 2018

(65) Prior Publication Data

US 2018/0244333 A1    Aug. 30, 2018

(30) Foreign Application Priority Data

Feb. 28, 2017 (JP) .................. 2017-036350

(51) Int. Cl.
| | | |
|---|---|---|
| B60K 11/04 | (2006.01) | |
| B62K 25/28 | (2006.01) | |
| B62K 19/12 | (2006.01) | |
| B62H 1/02 | (2006.01) | |
| B62K 11/04 | (2006.01) | |

(52) U.S. Cl.
CPC ............. B62K 11/04 (2013.01); B62H 1/02 (2013.01); B62K 19/12 (2013.01); B62K 25/28 (2013.01)

(58) Field of Classification Search
CPC ........ B62K 11/04; B62K 19/12; B62K 19/04; B62K 19/16; B62K 25/28; B62H 1/02
See application file for complete search history.

(56) References Cited

U.S. PATENT DOCUMENTS

| | | | | |
|---|---|---|---|---|
| 5,240,268 A | * | 8/1993 | Allsop | ............... B62J 1/04 280/220 |
| 5,845,728 A | * | 12/1998 | Itoh | ............... B62K 11/04 180/219 |
| 7,048,083 B1 | * | 5/2006 | Carpenter | ............ B62K 11/04 180/219 |

(Continued)

FOREIGN PATENT DOCUMENTS

| | | |
|---|---|---|
| JP | 2007-062618 | 3/2007 |
| JP | 2011-073590 | 4/2011 |

OTHER PUBLICATIONS

Judith Letterer, "Ilmberger enters the race with new carbon parts", XP-002782993, Retrieved from the Internet: URL: http://www.bikeundbusiness.de/ilmberger-geht-mit-neuen-carbonparts-ins-rennen-a-582664/, Feb. 16, 2017 (Feb. 16, 2017).

(Continued)

*Primary Examiner* — Gregory A Blankenship
(74) *Attorney, Agent, or Firm* — Rankin, Hill & Clark LLP

(57) ABSTRACT

A vehicle body frame includes a head section that rotatably supports a steering shaft, and main frames extending from the head section toward a rear side of a vehicle body. A cross section of the main frame in a direction crossing a vehicle body forward/rearward direction is formed in a substantially rectangular shape having a vertical width larger than a lateral width. A carbon fiber reinforced resin in which carbon fibers are oriented uniformly in the vehicle body forward/rearward direction is installed on at least one of upper surfaces and lower surfaces of the main frames.

6 Claims, 7 Drawing Sheets

(56) References Cited

U.S. PATENT DOCUMENTS

| | | | | |
|---|---|---|---|---|
| 2002/0059728 A1* | 5/2002 | Mochizuki | ............ | B21D 53/86 |
| | | | | 29/897.2 |
| 2015/0122570 A1* | 5/2015 | Miyashiro | ................ | B60K 1/04 |
| | | | | 180/220 |
| 2016/0076494 A1* | 3/2016 | Nishimura | ............. | B62K 11/00 |
| | | | | 180/219 |
| 2016/0280306 A1* | 9/2016 | Miyashiro | .............. | B62K 11/04 |
| 2017/0327175 A1* | 11/2017 | Moore | ..................... | B62K 3/10 |
| 2018/0072364 A1* | 3/2018 | Matsuo | .................... | B62J 17/00 |
| 2018/0208265 A1* | 7/2018 | Lo | ......................... | B29C 70/462 |
| 2018/0244333 A1* | 8/2018 | Iwakami | ................ | B62K 19/12 |
| 2018/0244334 A1* | 8/2018 | Iwakami | ................ | B62K 19/02 |
| 2018/0312211 A1* | 11/2018 | Logan | ................... | B62K 21/02 |

OTHER PUBLICATIONS

European Search Report dated Jul. 27, 2018, 7 pages.
European Search Report dated Jul. 12, 2018, 7 pages.

* cited by examiner

VEHICLE BODY FRAME STRUCTURE FOR SADDLE RIDING VEHICLE

CROSS-REFERENCE TO RELATED APPLICATION

Priority is claimed on Japanese Patent Application No. 2017-036350, filed Feb. 28, 2017, the content of which is incorporated herein by reference.

BACKGROUND

Field of the Invention

The present invention relates to a vehicle body frame structure for a saddle riding vehicle.

Description of Related Art

There is known a vehicle body frame for a saddle riding vehicle such as a motorcycle or the like including a head section configured to pivotably support a steering shaft, and a pair of left and right main frames extending from the head section toward a rear side of a vehicle body, wherein a pivot frame configured to vertically swingably support a swing arm is connected to rear sections of the pair of left and right main frames, and a power unit is supported by the main frames and the pivot frame (for example, see Japanese Unexamined Patent Application, First Publication No. 2007-2618).

In the vehicle body frame structure disclosed in Japanese Unexamined Patent Application, First Publication No. 2007-62618, the pair of main frames are formed of a metal material such as an aluminum alloy or the like. While each of the main frames is formed to be hollow by casting, since the main frame is a strength member configured to support a power unit that is a heavy article, an occupant load, or the like, high rigidity in an upward/downward direction is required, and further, adequate deflection characteristics in a leftward/rightward direction are required to increase turning ability of the vehicle. For this reason, in the vehicle body frame structure disclosed in Japanese Unexamined Patent Application, First Publication No. 2007-62618, the left and right main frames are formed such that a cross section in a direction crossing a vehicle body forward/rearward direction is a substantially rectangular shape having a vertical width larger than a lateral width.

SUMMARY

However, in the vehicle body frame structure disclosed in Japanese Unexamined Patent Application, First Publication No. 2007-62618, since the main frame is formed of a metal material as a whole, in order to avoid occurrence of a blowhole or misrun of melted metal during casting, a ratio of a thickness of a sidewall with respect to a thickness of upper and lower walls of the main frame cannot be lowered to a certain degree or more. That is, when the ratio of the thickness of the sidewall with respect to the thickness of the upper and lower walls of the main frame is lowered to the certain degree or more, during casting, a blowhole easily occurs in the upper and lower walls, and the misrun of melted metal easily occurs in the sidewall.

For this reason, in the vehicle body frame structure disclosed in Japanese Unexamined Patent Application, First Publication No. 2007-62618, because it is difficult due to manufacturing limitations to simultaneously provide adequate deflection characteristics in the leftward/rightward direction of the main frame and high rigidity in the upward/downward direction, an advanced manufacturing technology is required, and cost is high.

An aspect of the present invention is to provide a vehicle body frame structure for a saddle riding vehicle capable of improving turning ability of the vehicle while obtaining adequate deflection characteristics in a leftward/rightward direction of a main frame and high rigidity in an upward/downward direction.

A vehicle body frame structure for a saddle riding vehicle according to the present invention employs the following configuration.

(1) A vehicle body frame structure for a saddle riding vehicle according to the present invention includes a head section that rotatably supports a steering shaft; and a main frame extending from the head section toward a rear side of a vehicle body, wherein a cross section of the main frame in a direction crossing a vehicle body forward/rearward direction is formed in a substantially rectangular shape having a vertical width larger than a lateral width, and a carbon fiber reinforced resin in which carbon fibers are oriented uniformly in the vehicle body forward/rearward direction is installed on at least one of an upper surface and a lower surface of the main frame.

According to the above-mentioned configuration, when a bending load in an upward/downward direction is input to the main frame, bending in the upward/downward direction of the main frame in a longitudinal direction is suppressed by the carbon fiber reinforced resin installed on at least one of the upper surface and the lower surface of the main frame. For this reason, rigidity of the main frame in the upward/downward direction can be increased while reducing a thickness of the upper wall or the lower wall of the main frame. Accordingly, the thickness of the sidewall can be reduced without decreasing the ratio of the thickness of the sidewall with respect to the thickness of the upper and lower walls of the main frame to a certain degree or more. Accordingly, when the structure is employed, adequate deflection characteristics of the main frame in the leftward/rightward direction and high rigidity in the upward/downward direction can be obtained without causing a blowhole or misrun of melted metal during manufacture.

(2) In the aspect of the above mentioned (1), the carbon fiber reinforced resin may be installed on both of the upper surface and the lower surface of the main frame.

In this case, rigidity of the main frame in the upward/downward direction can be increased while decreasing the thickness of the upper wall and the lower wall of the main frame.

(3) In the aspect of the above mentioned (1) or (2), the carbon fiber reinforced resin may be formed to bridge an upper surface or a lower surface of the main frame and a region of the head section substantially along an outer circumferential surface of a steering shaft.

In this case, rigidity of the head section can be increased by effectively utilizing tensile strength of the carbon fiber reinforced resin. In addition, since the main frame and the head section are reinforced by the continuous carbon fiber reinforced resin, coupling work of the carbon fiber reinforced resin with respect to the main body section of the vehicle body frame can be easily performed.

(4) In the aspect of any one of the above mentioned (1) to (3), the carbon fiber reinforced resin may be formed symmetrically with respect to a center of the main frame in a cross section of the main frame.

In this case, in a cross section of the main frame, since the carbon fiber reinforced resin is formed symmetrically, left and right rigidity balance is equalized during turning of the vehicle. Accordingly, turning ability of the vehicle is further improved.

According to the aspect of the present invention, since the carbon fiber reinforced resin in which carbon fibers are oriented uniformly in the vehicle body forward/rearward direction is installed on at least one of the upper surface and the lower surface of the main frame, adequate deflection characteristics of the main frame in the leftward/rightward direction and high rigidity in the upward/downward direction can be obtained. Accordingly, turning ability of the vehicle can be improved.

DESCRIPTION EMBODIMENTS

DETAILED DESCRIPTION OF THE INVENTION

Figure 1:
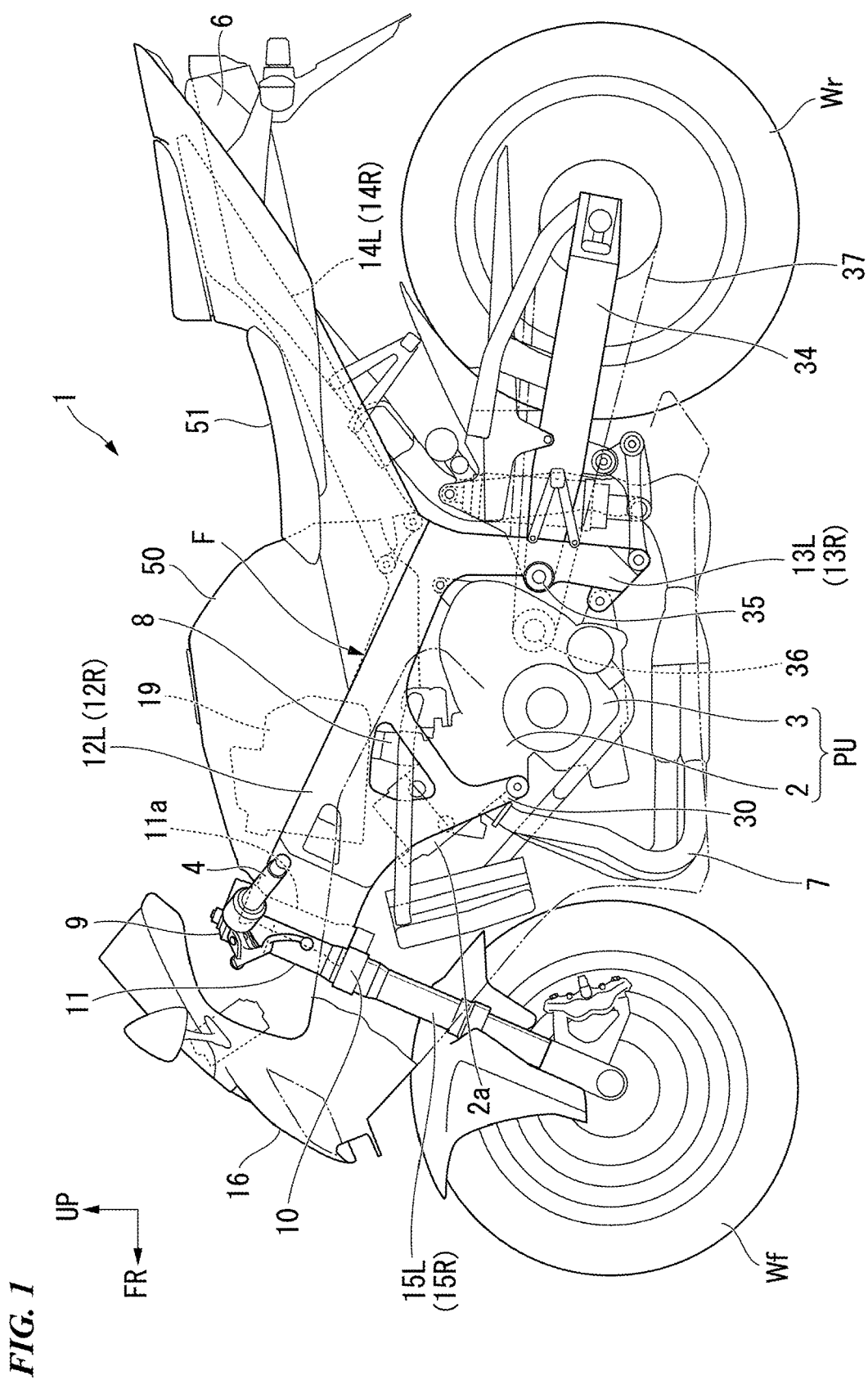
FIG. 1 is a side view of a saddle riding vehicle according to an embodiment of the present invention.

Hereinafter, embodiments of the present invention will be described on the basis of the accompanying drawings. Further, directions of forward, rearward, leftward, rightward, and the like described below are the same as directions in a vehicle described below unless the context clearly indicates otherwise. In addition, in the drawings, an arrow FR showing a forward direction with respect to a vehicle, an arrow UP showing an upward direction with respect to the vehicle, and an arrow LH showing a leftward direction with respect to the vehicle are provided.

Initially, a first embodiment shown in FIGS. 1 to 4 will be described.

FIG. 1 is a view showing a saddle riding vehicle according to the embodiment from a left side.

The saddle riding vehicle according to the embodiment is a motorcycle having a front wheel Wf and a rear wheel Wr, and the rear wheel Wr is driven by an engine 2. Hereinafter, the saddle riding vehicle of the embodiment is also referred to as "a motorcycle 1."

A vehicle body frame F of the motorcycle 1 includes a head section 11 disposed on a front end portion of the vehicle body frame F and configured to support a steering shaft (not shown) in a rotatable manner, a pair of left and right main frames 12L and 12R extending from the head section 11 to be branched off leftward and rightward in diagonally rearward and downward directions, a pair of left and right pivot plates 13L and 13R extending downward from rear regions of the main frames 12L and 12R, and a pair of left and right seat frames 14L and 14R extending from rear end portions of the main frames 12L and 12R in a diagonally rearward and upward direction of the vehicle body. A head pipe 11a configured to axially support the steering shaft is buried in the head section 11.

Further, members among the above-mentioned members that are overlapped and not seen on the front and the back directions of the drawings (for example, the main frame 12R) are designated by reference numerals with parentheses for convenience of illustration. In the following description, members that are overlapped and not seen on the front and the back directions of the drawings are treated similarly.

A top bridge 9 and a bottom bridge 10 are fixed to upper and lower end portions of the steering shaft supported by the head section 11. Left and right front forks 15L and 15R serving as suspension members are supported by the top bridge 9 and the bottom bridge 10. The front wheel Wf is rotatably and axially supported by lower end portions of the front forks 15L and 15R. A steering handle 4 is attached to an upper section of the top bridge 9.

In addition, a front cowl 16 configured to cover a front side of the head section 11 is attached to the head section 11.

A fuel tank 50 is attached to upper sections of the main frames 12L and 12R. A seat 51 on which an occupant sits is supported by the seat frames 14L and 14R of a rear section side of the fuel tank 50.

A power unit PU having the engine 2 and a transmission 3 as main elements is installed below the main frames 12L and 12R. The power unit PU is supported by the main frames 12L and 12R and the pivot plates 13L and 13R. The engine 2 of the power unit PU has a cylinder section 2a standing up at an upper side of the front section. An intake pipe 8 is connected to an upper side of the cylinder section 2a, and an exhaust pipe 7 is connected to a lower side of the cylinder section 2a.

Hanger sections 30 extending rearward and downward diagonally are installed integrally with lower edges closer to front sections of the left and right main frames 12L and 12R. A portion of the engine 2 is supported by the hanger sections 30.

An air cleaner 19 is connected to the intake pipe 8 via a throttle body (not shown). The air cleaner 19 is disposed between the left and right main frames 12L and 12R above the cylinder section 2a.

In addition, the exhaust pipe 7 is routed from a lower side of the cylinder section 2a toward a rear side of the vehicle body, and a muffler 6 is connected to a rear end portion thereof.

A pivot shaft 35 is installed at the left and right pivot plates 13L and 13R. A front end portion of a swing arm 34 is axially supported at the pivot shaft 35 to be vertically swingable. The rear wheel Wr is rotationally and axially supported at a rear end portion of the swing arm 34. An axle of the rear wheel Wr is connected to an output shaft 36 of the power unit PU via a drive chain 37 to enable power transmission.

Figure 2:
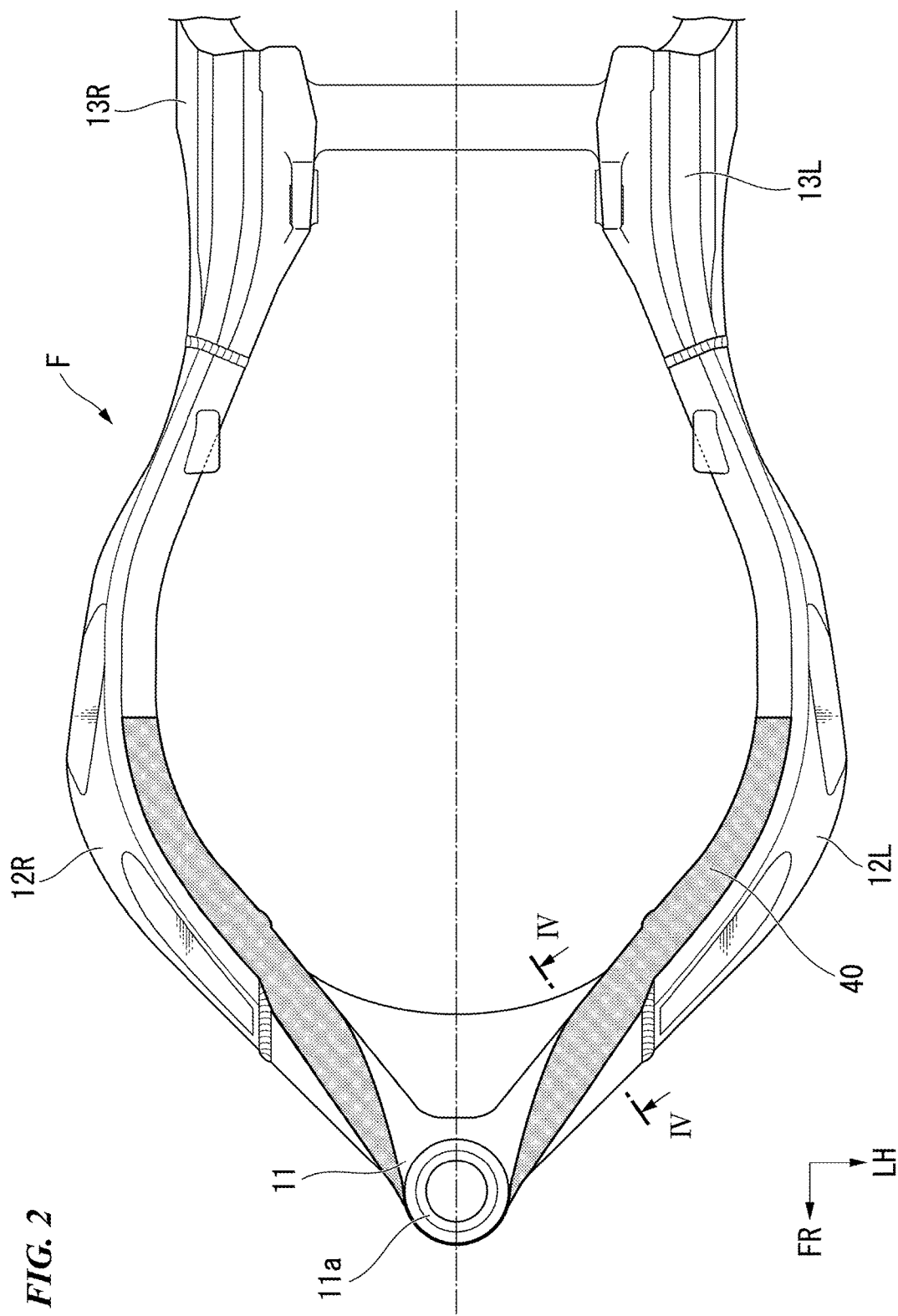
FIG. 2 is a plan view of a vehicle body frame of a first embodiment of the present invention.
Figure 3:
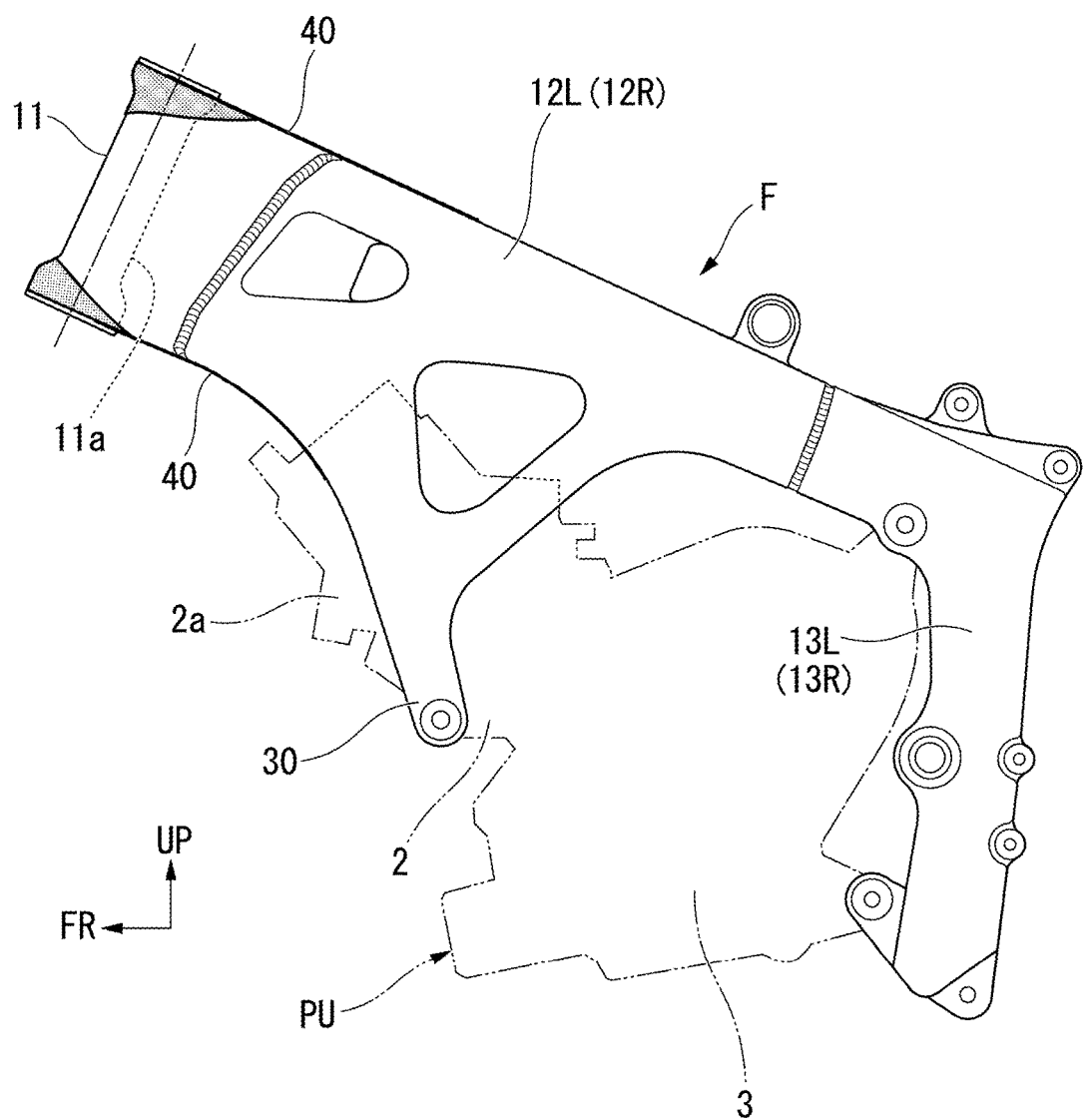
FIG. 3 is a side view of the vehicle body frame of the first embodiment of the present invention.

FIG. 2 is a view showing a main section of the vehicle body frame F from above, and FIG. 3 is a view showing the main section of the vehicle body frame F from a left side. In addition, FIG. 4 is a view showing a cross section taken along line IV-IV of the vehicle body frame F in FIG. 2.

As shown in FIGS. 2 and 3, the vehicle body frame F includes front regions of the head section 11 and the left and right main frames 12L and 12R, intermediate regions of the left and right main frames 12L and 12R, and rear regions of the left and right pivot plates 13L and 13R and the main frames 12L and 12R, which are formed of a metal material such as an aluminum alloy or the like through casting, respectively. Main sections of these metal blocks are formed in, for example, a hollow shape as shown in FIG. 4. In addition, these metal blocks are joined to each other through welding or the like after casting.

Figure 4:
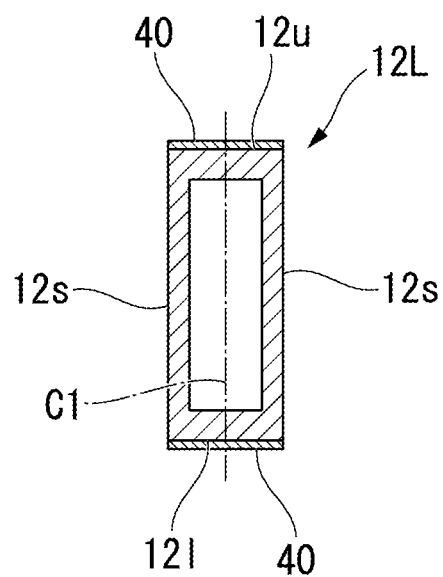
FIG. 4 is a cross-sectional view taken along line IV-IV in FIG. 2 of the vehicle body frame of the first embodiment of the present invention.

As shown in FIG. 4, each of the left and right main frames 12L and 12R is formed such that a cross section in a direction crossing a vehicle body forward/rearward direction is formed in a substantially rectangular shape having a vertical width larger than a lateral width. Then, a belt-like carbon fiber reinforced resin 40 in which carbon fibers are oriented uniformly in the vehicle body forward/rearward direction is joined to upper surfaces 12u and lower surfaces 12l of front regions of the left and right main frames 12L and 12R.

In the case of the embodiment, the carbon fiber reinforced resin 40 is constituted by a series of elongated belt-like pieces, and the belt-like pieces are provided in two sets. The carbon fiber reinforced resin 40 is joined to the upper surfaces 12u and the lower surfaces 12l of the left and right main frames 12L and 12R and circumferential regions of an upper edge side and a lower edge side of the head section 11. Specifically, one belt-like piece of one of the carbon fiber reinforced resin 40 is joined to bridge the upper surfaces 12u of the left and right main frames 12L and 12R and a region of an upper edge of the head section 11 substantially along an outer circumferential surface of the steering shaft, and another belt-like piece of the carbon fiber reinforced resin 40 is joined to bridge the lower surfaces 12l of the left and right main frames 12L and 12R and a region of a lower edge of the head section 11 substantially along an outer circumferential surface of the steering shaft. The carbon fiber reinforced resin 40 is not joined to left and right side surfaces 12s of the main frames 12L and 12R.

A width of each of the belt-like pieces of the carbon fiber reinforced resin 40 is substantially equal to a width of each of upper and lower surfaces of the left and right main frames 12L and 12R. The carbon fiber reinforced resin 40 joined to the upper surfaces 12u and the lower surfaces 12l of the main frames 12L and 12R is formed symmetrically with reference to a center cl in a width direction of each of the main frames 12L and 12R in a cross section crossing the forward/rearward direction of the main frames 12L and 12R.

Further, while the carbon fiber reinforced resin 40 is installed on the upper surfaces 12u and the lower surfaces 12l of the main frames 12L and 12R in the embodiment, the carbon fiber reinforced resin 40 may be formed on any one surface of the upper surfaces 12u and the lower surfaces 12l of the main frames 12L and 12R.

As described above, in the vehicle body frame structure according to the embodiment, the carbon fiber reinforced resin 40 in which carbon fibers are oriented uniformly in the vehicle body forward/rearward direction is joined to the upper surfaces 12u and the lower surfaces 12l of the main frames 12L and 12R. For this reason, when a bending load in the upward/downward direction is input to the main frames 12L and 12R, bending in the upward/downward direction in the longitudinal direction of the main frames 12L and 12R is suppressed by the carbon fibers oriented uniformly in the vehicle body forward/rearward direction of the carbon fiber reinforced resin 40.

Accordingly, in the vehicle body frame structure, rigidity of the main frames 12L and 12R in the upward/downward direction can be increased while decreasing the thickness of the upper wall or the lower wall of the casting sections of the main frames 12L and 12R.

Thus, the thickness of the sidewall can also be reduced without decreasing the ratio of the thickness of the sidewall with respect to the thickness of the upper and lower walls of the casting sections of the main frames 12L and 12R to a certain degree or more. Accordingly, when the vehicle body frame structure according to the embodiment is employed, adequate deflection characteristics of the main frames 12L and 12R in the leftward/rightward direction and high rigidity in the upward/downward direction can be obtained without causing a blowhole or misrun of melted metal during casting of the main frames 12L and 12R. As a result, turning performance of the vehicle can be improved.

In addition, in the embodiment, the belt-like pieces of the carbon fiber reinforced resin 40 are joined to bridge the upper surfaces 12u or the lower surfaces 12l of the main frames 12L and 12R and the region of the head section 11 substantially along the outer circumferential surface of the steering shaft. For this reason, rigidity of a periphery of the head section 11 can be increased by effectively utilizing tensile strength of the carbon fiber reinforced resin 40.

In addition, when the continuous belt-like pieces of the carbon fiber reinforced resin 40 are joined to bridge the upper surfaces 12u or the lower surfaces 12l of the main frames 12L and 12R and the region of the head section 11 substantially along the outer circumferential surface of the steering shaft, as in the embodiment, coupling work of the carbon fiber reinforced resin 40 with respect to the main frames 12L and 12R and the head section 11 can be easily performed.

Further, in the vehicle body frame structure of the embodiment, the carbon fiber reinforced resin 40 is installed symmetrically with reference to the center of the main frames 12L and 12R in the width direction in a cross section crossing the forward/rearward direction of the main frames 12L and 12R. For this reason, when the above-mentioned configuration is employed, left and right rigidity balance of the vehicle during turning is equalized, and turning ability of the vehicle is improved.

Figure 5:
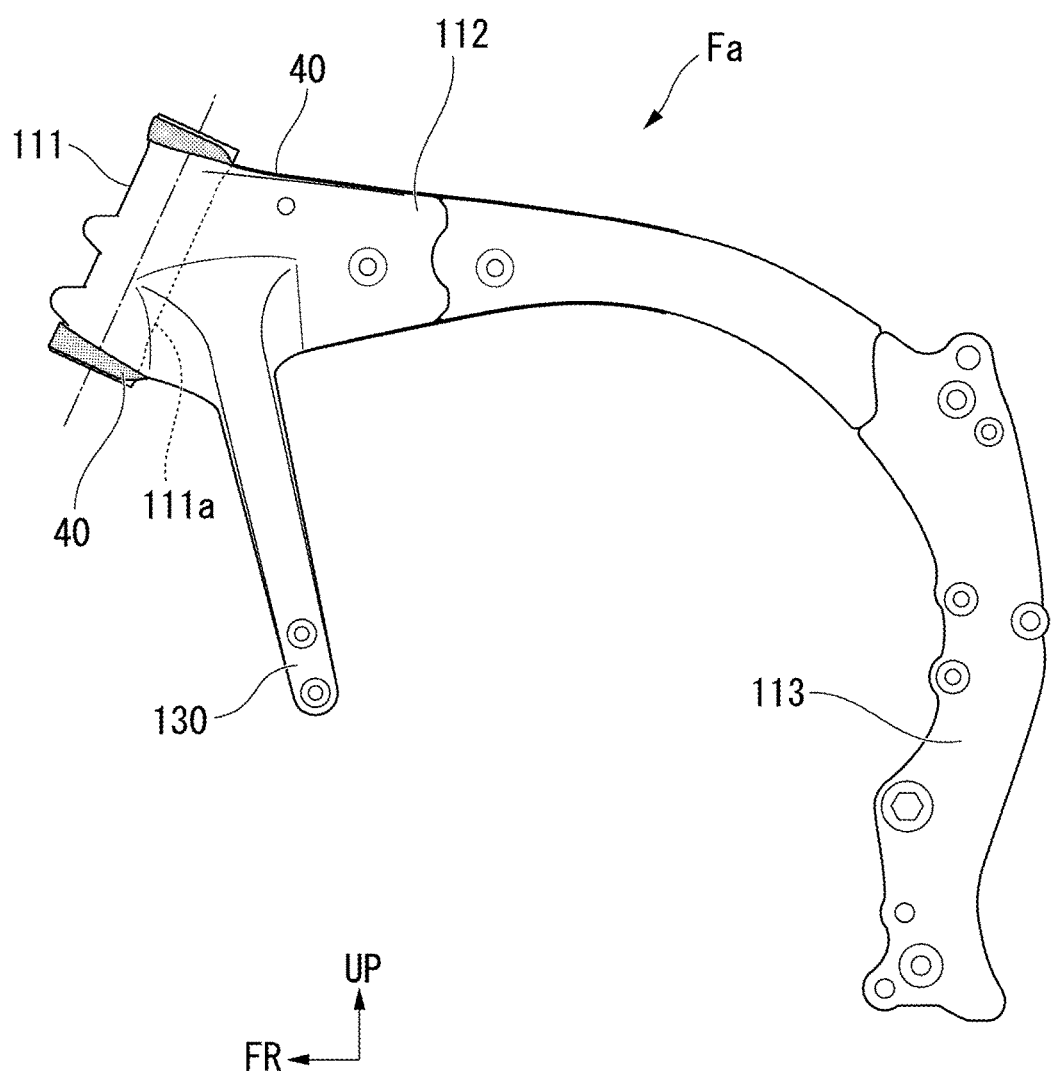
FIG. 5 is a side view of a vehicle body frame of a second embodiment of the present invention.
Figure 6:
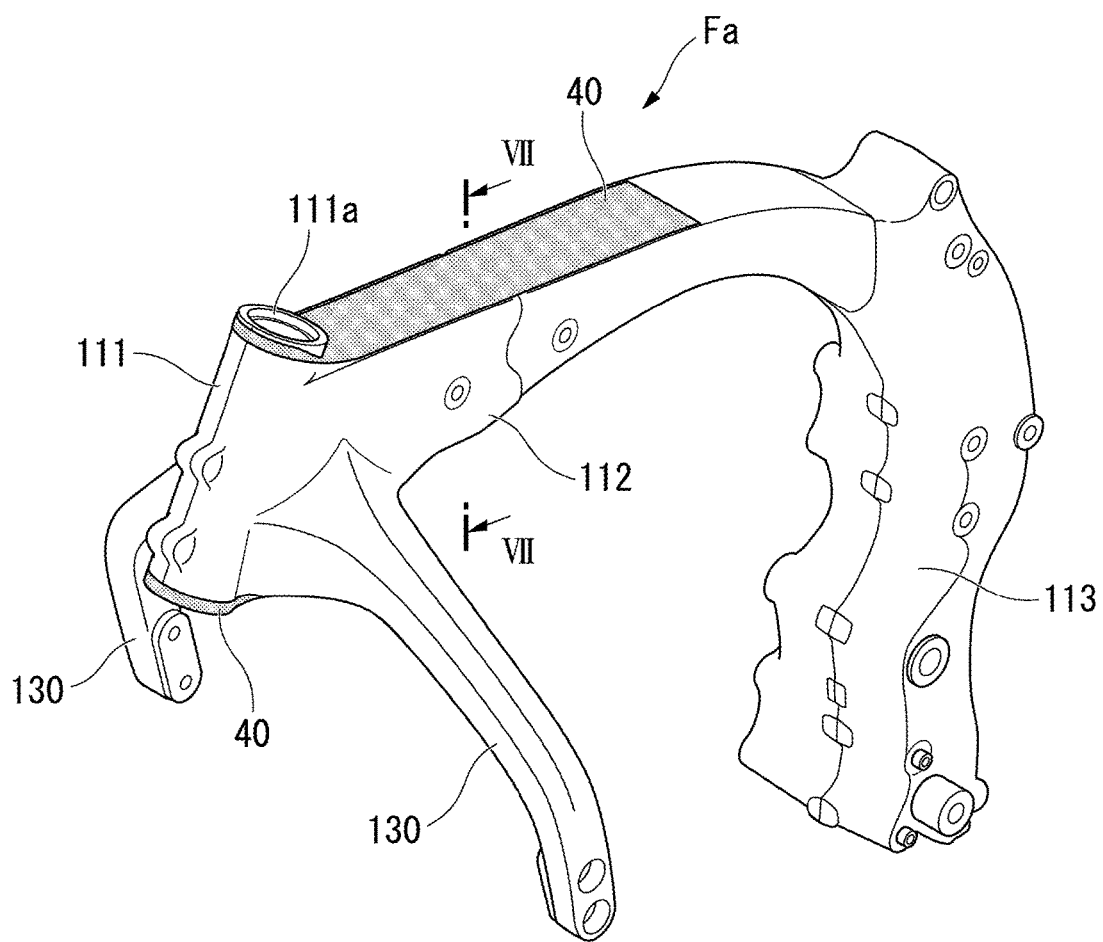
FIG. 6 is a perspective view of the vehicle body frame of the second embodiment of the present invention.
Figure 7:
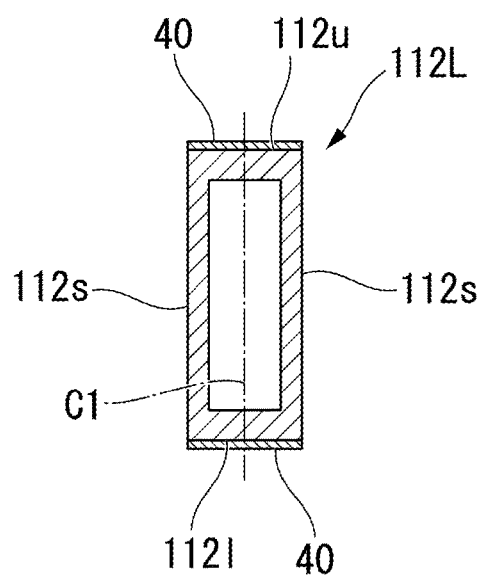
FIG. 7 is a cross-sectional view taken along line VII-VII in FIG. 6 of the vehicle body frame of the second embodiment of the present invention.

FIG. 5 is a view showing a main section of a vehicle body frame Fa of a second embodiment from a left side, and FIG. 6 is a perspective view of the vehicle body frame Fa of the second embodiment. In addition, FIG. 7 is a cross-sectional view taken along line VII-VII in FIG. 6.

While the vehicle body frame F of the first embodiment is a vehicle body frame in which a pair of main frames 12L and 12R are branched off leftward and rightward from the head section 11 to extend toward a rear side of the vehicle body, the vehicle body frame Fa of the second embodiment is a vehicle body frame in which a main frame 112 extends from the head section 111 toward a rear side of the vehicle body and a single pivot frame 113 is joined to a rear section of the main frame 112.

Further, reference numeral 130 in FIGS. 5 and 6 designates hanger sections extending downward diagonally from both of left and right sides of the main frame 112.

In the vehicle body frame Fa of the second embodiment, the carbon fiber reinforced resin 40 in which carbon fibers are oriented uniformly in the vehicle body forward/rearward direction is joined to an upper surface 112u and a lower surface 112l of the main frame 112 throughout substantially the entire width. In the case of the embodiment, a belt-like piece of the carbon fiber reinforced resin 40 is joined to bridge the upper surface 112u of the main frame 112 and a region of the head section 111 substantially along the outer circumferential surface of the steering shaft, and another belt-like piece of the carbon fiber reinforced resin 40 is joined to bridge the lower surface 112l of the main frame 112 and a region of the head section 111 substantially along the outer circumferential surface of the steering shaft.

The same effect as the above-mentioned embodiment can be obtained in the case of the vehicle body frame Fa of the second embodiment.

Further, the present invention is not limited to the embodiments, and various design changes may be made without departing from the scope of the present invention.

In addition, the saddle riding vehicle according to the present invention is not limited to a motorcycle (including a prime-mover-attached bicycle and a scooter type vehicle) and also includes a three-wheeled vehicle (including a two-front-wheeled and one-rear-wheeled vehicle and a one-front-wheeled and two-rear-wheeled vehicle) and a four-wheeled compact vehicle.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle body frame structure for a saddle riding vehicle comprising:
    a head section that rotatably supports a steering shaft; and
    a main frame extending from the head section toward a rear side of a vehicle body,
    wherein a cross section of the main frame in a direction crossing a vehicle body forward/rearward direction is formed in a substantially rectangular shape having a vertical width larger than a lateral width,
    a carbon fiber reinforced resin in which carbon fibers are oriented uniformly in the vehicle body forward/rearward direction is installed on at least one of an upper surface and a lower surface of the main frame, and
    the carbon fiber reinforced resin is installed on both of the upper surface and the lower surface of the main frame.

2. The vehicle body frame structure for a saddle riding vehicle according to claim 1,
    wherein the carbon fiber reinforced resin is formed to bridge the upper surface or the lower surface of the main frame and a region of the head section substantially along an outer circumferential surface of a steering shaft.

3. The vehicle body frame structure for a saddle riding vehicle according to claim 1,
    wherein the carbon fiber reinforced resin is formed symmetrically with respect to a center of the main frame in a cross section of the main frame.

4. The vehicle body frame structure for a saddle riding vehicle according to claim 2,
    wherein the carbon fiber reinforced resin is formed symmetrically with respect to a center of the main frame in a cross section of the main frame.

5. A vehicle body frame structure for a saddle riding vehicle comprising:
    a head section that rotatably supports a steering shaft; and
    a main frame extending from the head section toward a rear side of a vehicle body,
    wherein a cross section of the main frame in a direction crossing a vehicle body forward/rearward direction is formed in a substantially rectangular shape having a vertical width larger than a lateral width,
    a carbon fiber reinforced resin in which carbon fibers are oriented uniformly in the vehicle body forward/rearward direction is installed on at least one of an upper surface and a lower surface of the main frame, and
    the carbon fiber reinforced resin is formed to bridge the upper surface or the lower surface of the main frame and a region of the head section substantially along an outer circumferential surface of a steering shaft.

6. The vehicle body frame structure for a saddle riding vehicle according to claim 5,
    wherein the carbon fiber reinforced resin is formed symmetrically with respect to a center of the main frame in a cross section of the main frame.

* * * * *